United States Patent [19]

Akabane et al.

[11] 4,343,521
[45] Aug. 10, 1982

[54] BALL BEARING

[75] Inventors: Yukihiro Akabane, Tokyo; Hisashi Satoh, Hiratsuka; Yukio Shiraiwa, Yokohama; Shuyou Tsuchiya, Fujisawa, all of Japan

[73] Assignee: Nippon Seiko Kabushiki Kaisha, Tokyo, Japan

[21] Appl. No.: 170,660

[22] Filed: Jul. 21, 1980

[30] Foreign Application Priority Data

Aug. 23, 1979 [JP] Japan .................................. 54/106602

[51] Int. Cl.³ ......................... F16C 19/06; F16C 33/58
[52] U.S. Cl. .................................................... 308/193
[58] Field of Search ..................... 308/188, 189R, 190, 308/193, 194

[56] References Cited

U.S. PATENT DOCUMENTS

| 1,356,444 | 10/1920 | Golden | 308/193 |
| 1,587,184 | 6/1926 | Riebe | 308/193 |
| 2,142,478 | 1/1939 | Murden | 308/193 |
| 3,370,899 | 2/1968 | Eklund | 308/193 |
| 3,649,093 | 3/1972 | Muratore et al. | 308/193 |
| 3,751,123 | 8/1973 | Parker | 308/188 |
| 4,080,011 | 3/1978 | Wilke et al. | 308/189 R |

FOREIGN PATENT DOCUMENTS

| 428161 | 4/1926 | Fed. Rep. of Germany | 308/193 |
| 1169210 | 4/1964 | Fed. Rep. of Germany | 308/193 |
| 423231 | 4/1911 | France | 308/193 |
| 44637 | 3/1914 | Sweden | 308/193 |
| 356319 | 9/1961 | Switzerland | 308/193 |
| 681248 | 8/1979 | U.S.S.R. | 308/193 |

Primary Examiner—Richard R. Stearns
Attorney, Agent, or Firm—Shapiro and Shapiro

[57] ABSTRACT

In a ball bearing including an outer race, an inner race and ball-like rolling members interposed between the two races, the orbit grooves of the two races are noncircular and the orbit groove coefficient $F_1$ of the outer race is smaller than the orbit groove coefficient $F_2$ of the inner race.

2 Claims, 3 Drawing Figures

BALL BEARING

BACKGROUND OF THE INVENTION

1. Field of the Invention

This invention relates to a ball bearing, and more particularly to a ball bearing suited for a usage condition in which a high moment load and long rolling-contact life (flaking life, that is, life until generation of flaking) are required, for example, suited as the wheel bearing of the semi-float type rear axle of an automotive vehicle.

2. Description of the Prior Art

It has heretofore been proposed to make the bearing orbit non-circular so as to be capable of withstanding the high moment load of a bearing.

However, in the case of a bearing such as the wheel bearing of the semi-float type rear axle of an automotive vehicle in which the moment load condition is severe, the point of contact between rolling members (hereinafter referred to as the balls) and the orbit groove is moved to near the groove shoulder and part of the contact ellipse at the point of contact protrudes from the orbit groove (hereinafter referred to as the riding of the balls), thus causing a problem before the life of the bearing.

That is, when the riding of the balls occurs, streaks are created on the surface of the balls and obstructions such as noise and vibration arise.

SUMMARY OF THE INVENTION

It is the object of the present invention to provide a ball bearing in which the riding of balls is not liable to occur even under a severe moment load condition and which has a long flaking life.

The present invention intends to achieve such object by making the orbit grooves of an outer and an inner race non-circular as shown in FIG. 1 of the accompanying drawings and defining the orbit groove coefficient $F_1$ of the outer race and the orbit groove coefficient $F_2$ of the inner race as $$F_1 = \frac{\frac{\rho_{11}}{D} - 0.5}{\frac{\rho_{01}}{D} - 0.5} \quad F_2 = \frac{\frac{\rho_{12}}{D} - 0.5}{\frac{\rho_{02}}{D} - 0.5}$$

where $\rho_{01}$ is the curvature radius of the groove bottom of the orbit groove of the outer race, $\rho_{11}$ is the curvature radius of the groove edge of the orbit groove of the outer race, $\rho_{02}$ is the curvature radius of the groove bottom of the orbit groove of the inner race, $\rho_{12}$ is the curvature radius of the groove edge of the orbit groove of the inner race and D is the diameter of the balls, and correlatively grasping and regulating $F_1$ and $F_2$. A feature of the present invention lies in that $F_1$ is made smaller than $F_2$ and by doing so, the above object can be achieved.

The term "orbit groove coefficient" is defined as the rate of change of the difference between the curvature radius of the respective groove edge and the radius of a ball to the difference between the curvature radius of the groove bottom and the radius of the ball. Thus, the above formula for $F_1$, may be rewritten as follows:

$$F_1 = \frac{\rho_{11} - 0.5D}{\rho_{01} - 0.5D}$$

$$= \frac{\text{curvature radius of groove} - \text{radius}}{\text{edge of outer race}} - \frac{\text{radius of ball}}{\text{of ball}}$$
$$\frac{\text{curvature radius of groove} - \text{radius}}{\text{bottom of outer race}} - \frac{\text{radius of ball}}{\text{of ball}}$$

Similar considerations apply for $F_2$.

The invention will become fully apparent from the following detailed description thereof taken in conjunction with the accompanying drawings.

DESCRIPTION OF THE PREFERRED EMBODIMENTS

Embodiments of the present invention will hereinafter be described in the relation to the prior art with reference to the drawings.

Figure 1:
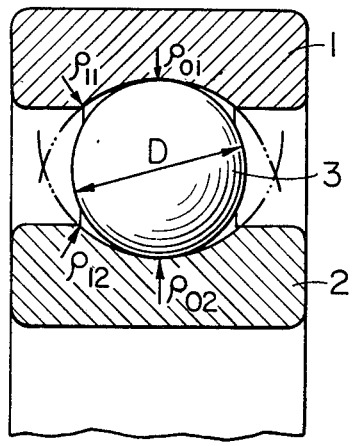
FIG. 1 is an enlarged, axial, fragmentary sectional view of the ball bearing according to the present invention.
Figure 2:
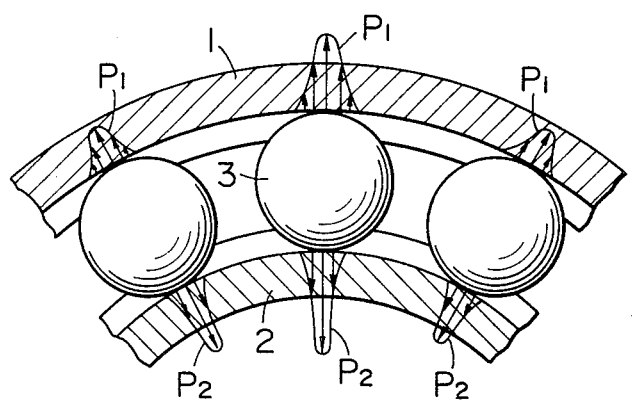
FIG. 2 is a fragmentary cross-sectional view showing the load distribution in the ball bearing according to the prior art.

In the conventional ball bearing, as shown in FIG. 2, the contact between an inner race 2 and balls 3 is such that convexity contacts convexity with respect to the circumferential direction and therefore, the width of the contact ellipse in the circumferential direction thereof becomes narrow and the peak value of the contact stress $P_2$ becomes great. Therefore, in the present invention, the shape of the orbit groove of the inner race near the bottom of the groove is made into a form which embraces the balls 3 as closely as possible.

Under such conditions, if the orbit groove coefficient $F_2$ of the inner race is $F_2 > 70$, the riding of the balls onto the orbit groove shoulder of the inner race will be prevented, but the contact surface pressure in the neighborhood of the shoulder will become great and flaking will become liable to occur. On the other hand, if $F_2 < 10$, the contact surface pressure in the neighborhood of the orbit groove shoulder will become small and flaking will be prevented, but the riding of the balls will occur. It is therefore desirable that the orbit groove of the inner race 2 satisfy the following condition:

$$10 \leq F_2 \leq 70 \quad \text{(I)}$$

On the other hand, the contact between an outer race and the balls in the conventional ball bearing is such that concavity contacts convexity in the circumferential direction as shown in FIG. 2 and therefore, as compared with the contact between the inner race 2 and the balls 3, the width of the contact ellipse in the circumferential direction thereof becomes wide and the peak value of the contact stress $P_1$ becomes small. Accordingly, reduction in life is not so great even if the shape of the orbit groove of the outer race near the bottom of the groove is one which does not embrace the balls so closely as the inner race does. That is, even if the curvature radius of the outer race near the bottom of the groove is made large as compared with that of the inner race, the flaking life of the outer race will be balanced with that of the inner race. By making the curvature radius of the outer race near the bottom of the groove greater than that of the inner race, it is possible to prevent the riding of the balls to some extent and therefore, the variation in the curvature radius from the groove bottom to the groove edge may be smaller than that in the inner race.

Now, assuming $F_1/F_2 > \frac{1}{3}$, the riding of the balls onto the orbit groove shoulder of the outer race will be prevented, but the contact surface pressure in the neighborhood of the shoulder will become great and flaking will occur. Also, assuming $F_1/F_2 < 1/10$, the contact surface pressure in the neighborhood of the shoulder will become small and flaking will be prevented, but the riding of the balls will become liable to occur. It is therefore desirable that the coefficient of the orbit groove of the outer race 1 satisfy the following condition:

$$\frac{1}{10} \leq \frac{F_1}{F_2} \leq \frac{1}{3} \quad \text{(II)}$$

Description will now be made of the result of the comparative experiment carried out for the embodiments of the present invention and the prior art bearing tested as the wheel bearing of the semi-float type rear axle of an automotive vehicle.

TABLE 1

| | | | | | | | |
|---|---|---|---|---|---|---|---|
| No. 1 | outer race | $\frac{\rho_{11}}{D} = 0.621$ | | $\frac{\rho_{01}}{D} = 0.520$ | $F_1 = 6.074$ | | $\frac{F_1}{F_2} = 0.324$ |
| | inner race | $\frac{\rho_{12}}{D} = 0.650$ | | $\frac{\rho_{02}}{D} = 0.508$ | $F_2 = 18.742$ | | |
| No. 2 | outer race | $\frac{\rho_{11}}{D} = 0.629$ | | $\frac{\rho_{01}}{D} = 0.527$ | $F_1 = 4.780$ | | $\frac{F_1}{F_2} = 0.255$ |
| | inner race | $\frac{\rho_{12}}{D} = 0.650$ | | $\frac{\rho_{02}}{D} = 0.508$ | $F_2 = 18.742$ | | |
| No. 3 | outer race | $\frac{\rho_{11}}{D} = 0.627$ | | $\frac{\rho_{01}}{D} = 0.535$ | $F_1 = 3.616$ | | $\frac{F_1}{F_2} = 0.193$ |
| | inner race | $\frac{\rho_{12}}{D} = 0.650$ | | $\frac{\rho_{02}}{D} = 0.508$ | $F_2 = 18.742$ | | |
| No. 4 | outer race | $\frac{\rho_{11}}{D} = 0.540$ | | $\frac{\rho_{01}}{D} = 0.540$ | $F_1 = 1$ | | $\frac{F_1}{F_2} = 1$ |
| | inner race | $\frac{\rho_{12}}{D} = 0.517$ | | $\frac{\rho_{02}}{D} = 0.517$ | $F_2 = 1$ | | |

In the above table $\rho_{01}$ is the curvature radius of the groove bottom of the orbit groove of the outer race, $\rho_{11}$ is the curvature radius of the groove edge of the orbit groove of the outer race, $\rho_{02}$ is the curvature radius of the groove bottom of the inner race, $\rho_{12}$ is the curvature radius of the groove edge of the inner race, and D is the diameter of the balls, $F_1$ is the orbit groove coefficient of the outer race, and $F_2$ is the orbit groove coefficient of the inner race.

Figure 3:
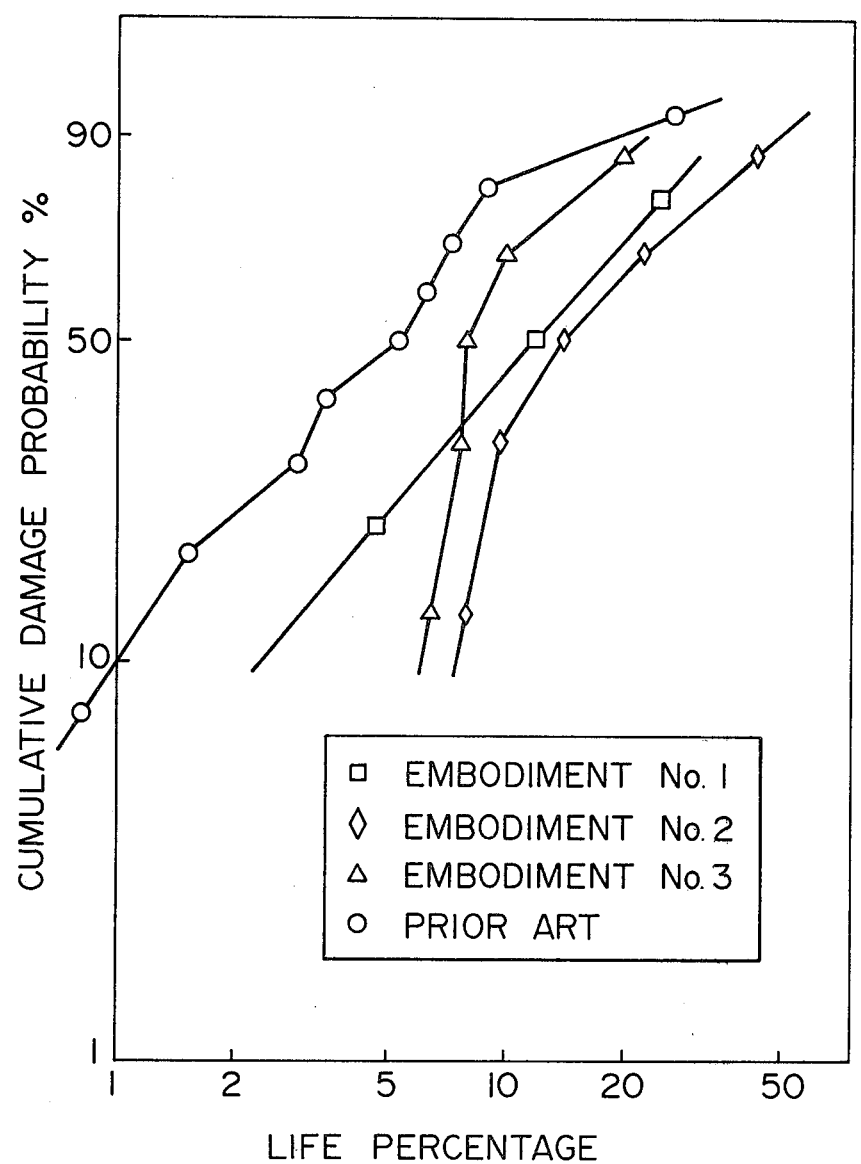
FIG. 3 is a graph showing the result of the comparative experiment carried out regarding the cumulative damage probability in the embodiments of the present invention and the bearing of the prior art.

FIG. 3 is a graph in which the relation between the life percentage and the cumulative damage probability in the specific examples of Table 1 with No. 4 as the standard has been plotted. As is apparent from FIG. 3, the values of these bearings at 90% reliable life percentage are 2.33 for No. 1 embodiment, 7.44 for No. 2 embodiment and 6.05 for No. 3 embodiment, respectively, when the value of No. 4 which is the prior art bearing is 1.

Thus, according to the embodiment of the present invention, the life of the bearing can be remarkably increased as compared with the bearing of the prior art.

Further, according to the result of the riding test in the wheel bearing of the semi-float type rear axle of an automotive vehicle, in the case of the outer wheel bearing during turning, the riding of the balls onto the groove shoulder occurred for a centrifugal acceleration of 0.6 G or higher in the prior art bearing, whereas according to No. 2 embodiment, the riding did not occur unless the centrifugal acceleration exceeded 1G.

According to the present invention, there is provided a ball bearing which is excellent in the riding prevention effect and has a long life.

Although the present invention has been described with respect to the wheel bearing of the semi-float type rear axle of an automotive vehicle, it is also applicable to a condition in which moment load is particularly great, for example, to the ball bearing in a stirrer wherein the length between the cantilever shaft and the bearing is great and the bend of the shaft is great.

What we claim is:

1. In a ball bearing including an outer race, an inner race and ball-like rolling members interposed between said two races, the orbit grooves of said two races and being non-circular, the improvement residing in that when the orbit groove coefficient $F_1$ of said outer race and the orbit groove coefficient $F_2$ of said inner race are respectively expressed as $$F_1 = \frac{\frac{\rho_{11}}{D} - 0.5}{\frac{\rho_{01}}{D} - 0.5} \qquad F_2 = \frac{\frac{\rho_{12}}{D} - 0.5}{\frac{\rho_{02}}{D} - 0.5}$$

where $\rho_{01}$ is the curvature radius of the groove bottom of the orbit groove of said outer race, $\rho_{11}$ is the curvature radius of the groove edge of the orbit groove of said outer race, $\rho_{02}$ is the curvature radius of the groove bottom of said inner race, $\rho_{12}$ is the curvature radius the groove edge of said inner race and D is the diameter of said ball-like rolling members, $F_1$ is smaller than $F_2$.

2. A ball bearing according to claim 1, wherein $F_2$ satisfies the condition $$10 \leq F_2 \leq 70$$

and $F_1$ satisfies the condition $$\frac{1}{10} \leq \frac{F_1}{F_2} \leq \frac{1}{3}.$$

* * * * *